United States Patent [19]

Wareham

[11] Patent Number: 4,679,438
[45] Date of Patent: Jul. 14, 1987

[54] HIGH PRESSURE TRANSDUCER
[75] Inventor: William Wareham, Marion, Mass.
[73] Assignee: Dynisco, Inc., Norwood, Mass.
[21] Appl. No.: 798,169
[22] Filed: Nov. 14, 1985

Related U.S. Application Data

[63] Continuation-in-part of Ser. No. 689,385, Jan. 7, 1985.
[51] Int. Cl.$^4$ ............................. G01L 7/08; G01L 9/04
[52] U.S. Cl. ........................................... 73/726; 338/4;
338/42; 29/157 R; 29/454
[58] Field of Search ................. 73/726, 727, 730, 706,
73/721; 338/4, 42; 29/517, 454, 157 R

[56] References Cited

U.S. PATENT DOCUMENTS

3,349,623 10/1967 Paston ..................................... 73/726
3,645,136 2/1972 Calhound .............................. 73/726
3,884,078 5/1975 Zeiringer ............................... 73/726

Primary Examiner—Donald O. Woodiel
Attorney, Agent, or Firm—Wolf, Greenfield & Sacks

[57] ABSTRACT

A pressure transducer for in particular the measurement of relatively high pressures in the range of 10,000–50,000 psi and including an elongated frame having a capillary tube extending therethrough and employing a coupler at one end of the frame for sensing input pressure. A sensing member is provided disposed about the capillary tube at the other end of the frame and has, defined with the capillary tube, a sensing chamber in communication with the capillary tube. A recess is provided in the sensing member defining a relatively thin wall adjacent the annular sensing chamber. This wall has a pressure responsive sensing surface that extends substantially parallel to the capillary tube length and upon which strain gages are secured. A method as described for securing the capillary tube with the sensing member in a liquid tight manner.

12 Claims, 11 Drawing Figures

HIGH PRESSURE TRANSDUCER

RELATED APPLICATION

This is a continuation-in-part of application Ser. No. 689,385 filed Jan. 7, 1985.

BACKGROUND OF THE INVENTION

The present invention relates in general to pressure transducers and is concerned, more particularly, with a new and improved fluid-filled, direct-sensing pressure transducer. Even more particularly, the present invention relates to a pressure transducer adapted for high pressure measurements such as in the range of 10,000–50,000 psi. Moreover, the present invention relates to an improved method of forming the pressure transducer and in particular of interconnecting the transducer sensing element and capillary tube.

The following is a list of prior art patents that in general relate to pressure transducers: U.S. Pat. Nos. 3,349,623, 4,369,659, 3,678,753, 3,349,623, 2,940,313, 2,627,749, 2,326,047, 3,336,555, 2,738,677. Some of these patents are owned by the assignee herein and show fluid filled pressure transducers.

U.S. Pat. Nos. 2,949,313 and 2,627,749 both illustrate pressure indicators that employ strain tubes or the like for transmitting pressure to a diaphragm on which pressure is sensed by strain gages.

U.S. Pat. Nos. 3,326,047 and 3,336,555 illustrate pressure transducers. U.S. Pat. No. 3,336,555 illustrates an unfilled pressure transducer with strain gage sensing. U.S. Pat. No. 3,326,047 on the other hand illustrates a fluid filled pressure transducer employing a pressure sensing capsule having inner and outer deformable cylindrical walls. The liquid-filling in a transducer of this type has a relatively large volume and thus creates limitations upon the range of pressure measurements.

U.S. Pat. No. 2,738,677 is actually directed to a pressure indicator particularly for combustion chambers such as in an internal combustion engine.

Liquid-filled pressure transducers owned by the assignee herein include U.S. Pat. Nos. 3,349,623; 3,678,753; and 4,369,659. The early patent 3,349,623 describes a device employing an annular sensing chamber with associated strain gages. U.S. Pat. No. 3,678,753 is believed to be an improved form of the earlier version employing a top cap member and associated disc-shaped compartment defined between the cap member and the body of the instrument. The transducer illustrated in U.S. Pat. No. 3,678,753 provided an increased operating pressure range. U.S. Pat. No. 4,369,659 describes a melt pressure transducer preferably for use in pressure measurements associated with an injection molding machine and employing a novel temperature compensating filler rod.

Another prior art patent is U.S. Pat. No. 3,128,628 to Lebow. This patent illustrates a pressure transducer but does not employ any capillary tube.

In all of the prior art, referred to hereinbefore one of the main limitations, is the inability to operate particularly at high pressure levels such as in a pressure range of 10,000–50,000 psi.

Accordingly, one important object of the present invention is to provide a liquid-filled pressure transducer operating at high pressure ranges.

Another object of the present invention is to provide an improved pressure transducer that is fluid-filled and that employs a reduced volume of fluid. This reduced volume of fluid provides for minimization of temperature effects upon pressure and furthermore makes for improved diaphragm constructions.

Accordingly, a further object of the present invention is to provide an improved liquid-filled pressure transducer in which diaphragm stresses are reduced.

Still another object of the present invention is to provide an improved fluid-filled pressure transducer that provides for reduced snout diaphragm stresses during applied pressure and upon exposure to elevated temperature.

Still another object of the present invention is to provide an improved fluid-filled pressure transducer provided with a snout piece of a different material, provided for the purpose of temperature compensation and for improving overall performance. The snout piece permits the liquid-filled void to expand at the same rate as the liquid itself during temperature changes.

A further object of the present invention is to provide an improved method of construction of a liquid-filled pressure transducer, particularly an improved technique for interconnecting the sensing element and capillary tube of the pressure transducer.

SUMMARY OF THE INVENTION

To accomplish the foregoing and other objects features and advantages of the invention there is provided a pressure transducer which comprises an elongated frame having an elongated passage therethrough and a capillary tube extending through the frame passage and terminating at one end adjacent to one end of the frame. A coupler closes that one end of the frame and defines with the frame a chamber in communication with the capillary tube. A sensing member in accordance with the invention is disposed about the capillary tube at the other end of the frame and includes means defining an annular sensing chamber and fluid communication with the capillary tube. For this purpose there may be provided a passage transversely in the capillary tube to enable fluid communication from the capillary tube to this annular sensing chamber. The sensing member also includes means defining a recess therein forming a relatively thin wall adjacent the annular sensing chamber. This wall has a pressure responsive sensing surface that extends substantially parallel to the capillary tube length. The sensing of pressure may be accomplished by means of a strain gage arrangement disposed on the pressure responsive sensing surface of the relatively thin wall. The strain gage sensing means may be connected in a bridge arrangement. In accordance with one feature of the invention there is preferably also provided in the transducer at the diaphragm end thereof a snout piece of a different material than that of the frame of the transducer having a relatively low coefficient of expansion for providing temperature compensation.

Furthermore, in accordance with the present invention there is provided, in a liquid-filled pressure transducer having a frame, capillary tube extending through the frame, and a sensing element having a bore for receiving the capillary tube, an improved method of securing the sensing element to the capillary tube in a liquid-tight manner. The method comprises the steps of providing a weld prep indentation in the sensing element adjacent and about the sensing element bore, inserting the capillary tube in the sensing element and swaging the weld prep indentation so as to grip the capillary tube with at least a small gripping force. Finally, the area about the capillary tube is welded in the area where the weld prep indentation is disposed so as to form a liquid-tight well between the capillary tube and sensing element. The annular indentation is at least partially formed by an inner ridge adjacent the capillary tube and in accordance with the step of swaging the weld prep indentation, this step includes distortion of the indentation to deflect the inner ridge so as to contact the capillary tube about the circumference thereof. The formation of this weld for securing the capillary tube and sensing element is carried out at both ends of the sensing element through which the capillary tube extends.

BRIEF DESCRIPTION OF THE DRAWINGS

Numerous other objects features and advantages of the invention should now become apparent upon a reading of the following detailed description taken in conjunction with the accompanying drawings, in which.

DETAILED DESCRIPTION

Figure 5:
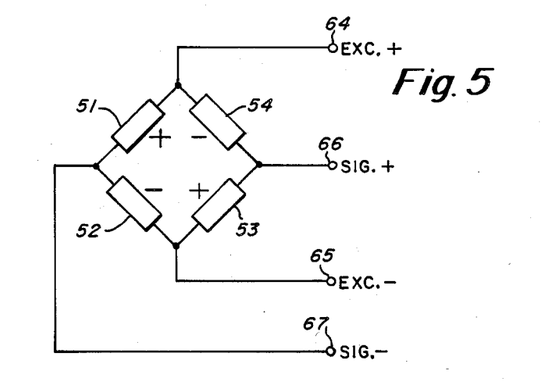
FIG. 5 is a schematic diagram illustrating the strain gage circuit employed in connection with the pressure transducer of the invention.
Figure 6:
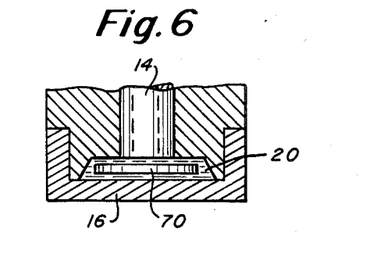
FIG. 6 is an enlarged cross-sectional view of a portion of a pressure transducer constructed in accordance with the invention and illustrating the further use of a snout filler piece.
Figure 7:
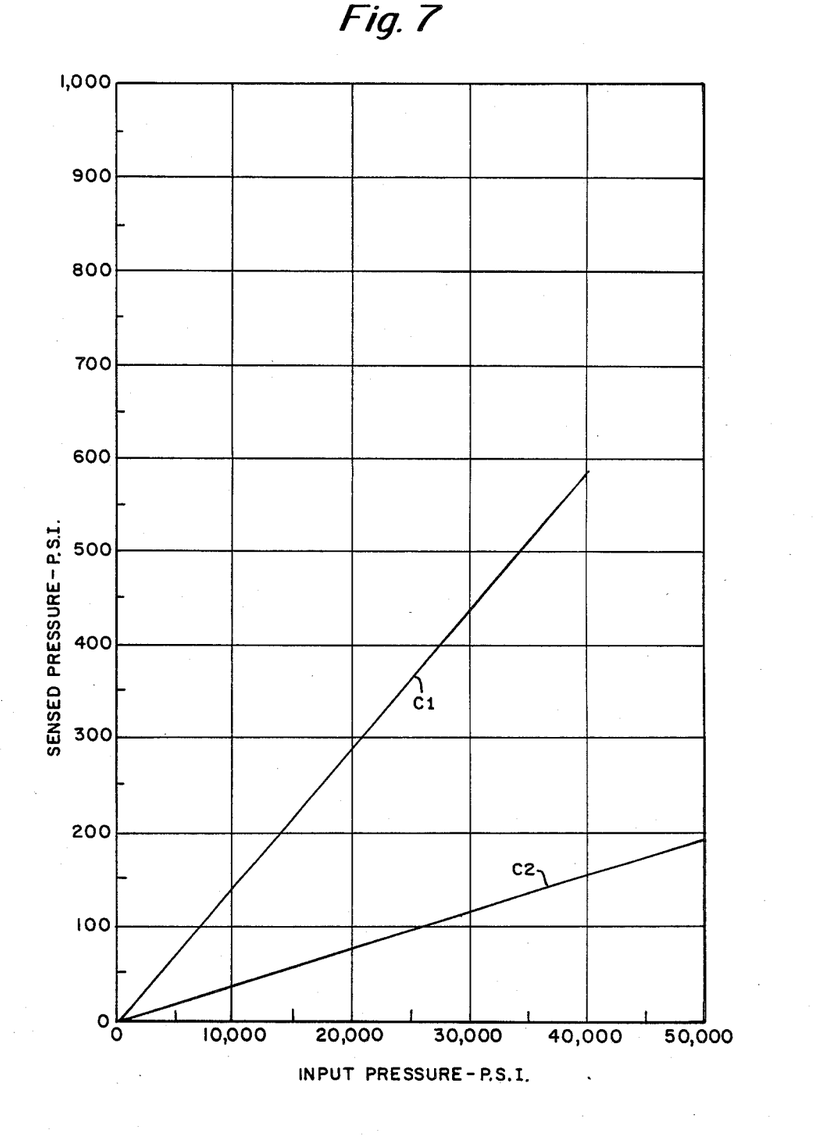
FIG. 7 is a graph illustrating input pressure versus pressure loss through the diaphragm.

Reference is now made to FIGS. 1-4 which show complete details of one embodiment of a pressure transducer in accordance with the invention. FIG. 5 shows the schematic diagram of the strain gage interconnections. FIG. 6 is an alternate embodiment from the standpoint of illustrating the preferred use of a filler piece at the diaphragm end of the transducer. FIG. 7 is a graph of illustrating transducer performance. FIGS. 8-11 illustrate steps in the method of the present invention concerned in particular with the securing of the capillary tube and sensing element in a liquid-tight manner.

With reference to FIGS. 1-4, the pressure transducer includes a main frame 10, a sensing member 12 provided at the top of the frame 10, a capillary tube 14 which extends through the frame, and a diaphragm coupler 16 secured to enclosing the bottom end of the frame.

Figures 1, 2, 3:
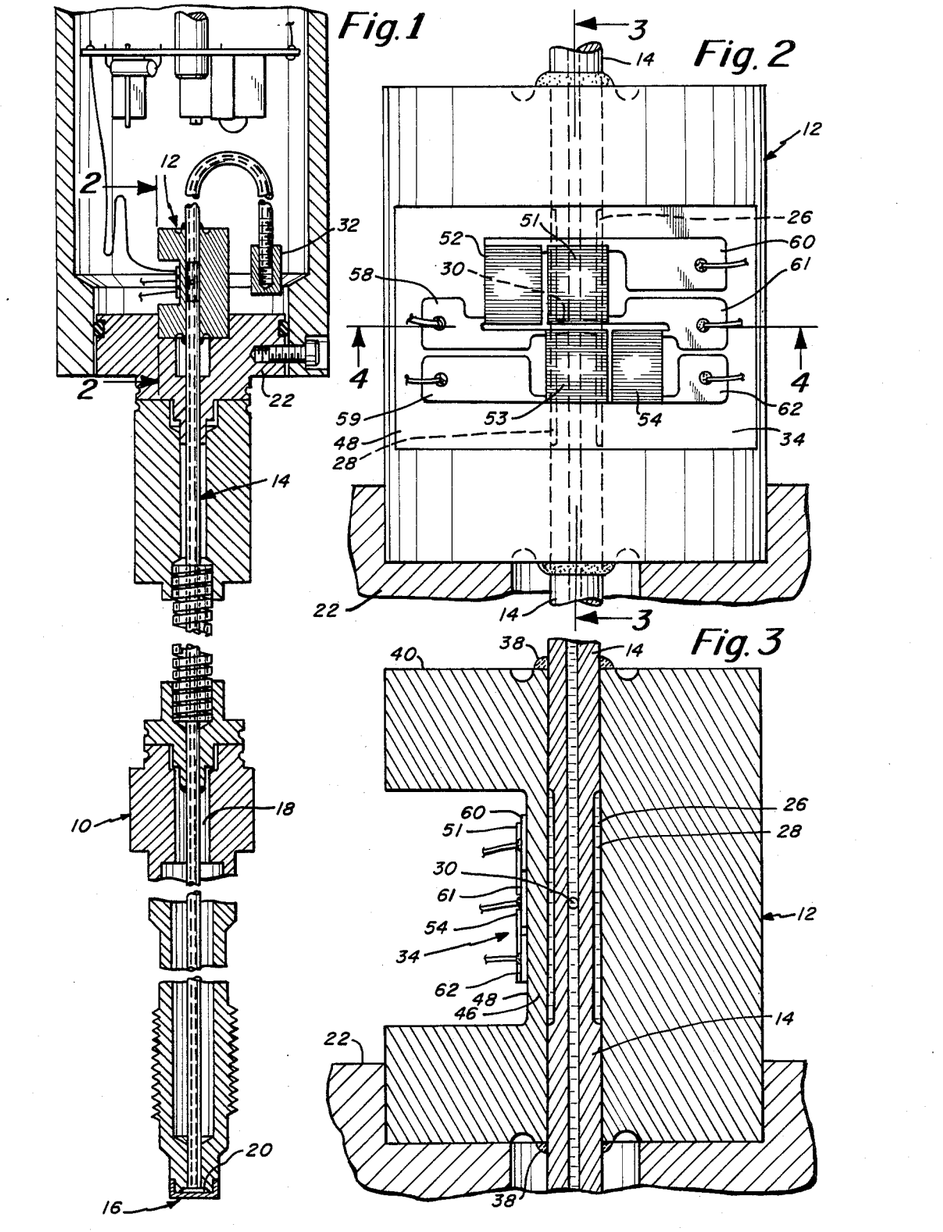
FIG. 1 is a cross-sectional side elevation view of a preferred embodiment of the fluid filled pressure transducer constructed in accordance with the present invention.
FIG. 2 is a cross-sectional view taken along line 2—2 of FIG. 1 showing further details of the sensing member.
FIG. 3 is a cross-sectional view taken along line 3—3 of FIG. 2 showing further details.
Figure 4:
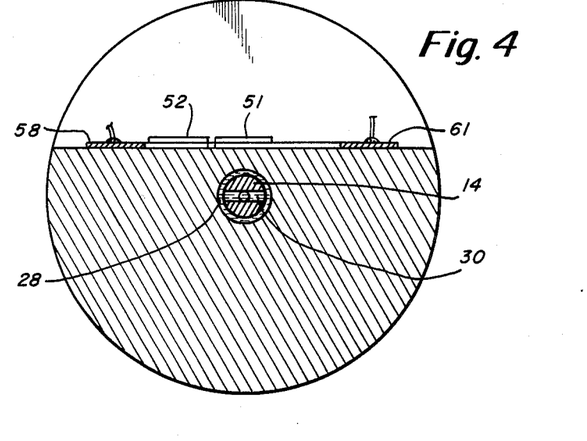
FIG. 4 is a cross-sectional view taken along line 4—4 of FIG. 2 showing still further details of the sensing member.

The lower section of the frame 10 is constructed in a similar manner to the construction illustrated in U.S. Pat. No. 3,678,753. Basically there is an elongated passage 18 that extends through the main frame and which is for accommodating the capillary tube 14. The capillary tube 14 at its bottom end terminates at a relatively small chamber 20 which is closed by the diaphragm 16.

At the top end of the frame 10 there is included as part of the frame a top piece 22 through which the capillary tube 14 extends. The top piece 22 is for supporting the sensing member 12 in the position illustrated in the drawing. The sensing member 12 may be secured in position within the top piece 22 by being welded to the top piece.

The capillary tube 14 as noted in, for example, FIG. 3, extends through a vertical passage in the sensing member 12. It is noted that in FIG. 3 that the capillary tube 14, in accordance with one embodiment of the invention, is provided with an annular recess 26 that defines an annular chamber 28 essentially defined by the recess in the capillary tube and the inner bore of the passage that extends vertically through the sensing member 12.

In order to provide fluid communication from the capillary tube to the chamber 28 there is provided a transverse passage 30 which is disposed in the position as illustrated in FIG. 3.

The sensing member 12, as indicated previously, includes a vertical passage through which the capillary tube 14 extends. As illustrated in FIG. 1, the capillary tube 14 also extends beyond the top of the sensing member 12 and is provided at its top end with some type of a filler cap 32. The sensing member 12 is furthermore constructed by machining a single flat surface on the outside of its cylindrical body. This is illustrated in FIGS. 1—3 by the recess 34 that extends in the vertical direction in FIG. 3 somewhat less than one third of the total height of the cylindrical sensing member. As indicated previously, the cylindrical sensing member is through-drilled along its full length at its center axis and fitted closely to the capillary tubing which passes therethrough. The capillary tubing is preferably TIG welded at both ends as illustrated by the welds 38 in FIG. 3. The ends of the sensing member 12, such as at surface 40 in FIG. 3, are machined to form weld-preparation surfaces including the cup shaped indentations so as to aid in maximizing weld penetration and strength between the capillary tube and the sensing member.

Prior to insertion of the capillary tube, a 0.015 to 0.020 inch diameter lateral hole 30 is drilled through the center of the capillary to allow fluid communication between the capillary tube and the annular chamber 28. The hole 30 may be drilled approximately 3 inches from one end of the sensing member and the relative position of the capillary tube and the sensing member are arranged so that the hole is placed as indicated in FIG. 3 at about the mid distance of the recess 34. The capillary is, of course, welded at both ends of the sensing element as illustrated in FIG. 3 to form essentially upper and lower liquid leak-tight joints.

Hydraulic pressure from inside of the capillary tube bore is transmitted to the annular sensing element by way of the hole 30. This fluid communication enables the inside surface of the sensing member to be pressurized.

The machined recess 34 defines a relatively thin wall 46, the thickness of which is perhaps somewhat exaggerated in FIG. 3. The wall 46 has a pressure responsive sensing surface 48 to which the strain gages are secured. Hydraulic pressure under the machined flat essentially at the annular chamber 28 creates high bending stresses across the thin flat wall 46 where the active strain gages are attached. This action senses the strained surface along the center line axis. In this regard, refer to FIG. 2 which illustrates, along the center line of the capillary 14, the active strain gages 51 and 53. Also note in FIG. 2 the other strain gages 52 and 54 which, with the strain gages 51 and 53, provide the total strain gage circuit. The strain gages 52 and 54 may be considered as the inactive strain gages but do sense some compression strains to add to the electrical sensitivity. However, the strain gages 52 and 54 are used primarily to complete the Wheatstone bridge and to provide thermal compensation.

FIG. 2 also shows, associated with the strain gages 51-54, electrical interconnection tabs. These include tabs 58 and 59 to the left in FIG. 2 and tabs 60, 61 and 62 to the right in FIG. 2. These connection tabs are connected with the strain gages so as to connect the strain gages in the pattern illustrated in FIG. 5. In FIG. 5 the same reference characters are employed to identify the same strain gages illustrated in FIG. 2. Thus, the circuit interconnection of FIG. 5 illustrates the strain gages 51-54 schematically represented as variable resistances, varying with applied pressure. These resistances are interconnected in a bridge arrangement as illustrated in FIG. 5 having excitation inputs at terminals 64 and 65 and having a signal output at terminals 66 and 67.

An electrical input signal is usually applied across the input terminals 64 and 65 and the pressure responsive voltage is measured across the output terminals 66 and 67. Once again, the active gages are gages 51 and 53 and thus the majority of the pressure responsive signal is generated by these legs of the bridge. The gages 52 and 54 primarily provide for temperature compensation so that if there is a change in temperature at the sensing member, the bridge is automatically adjusted by virtue of the temperature of both of the nonactive gages causing essentially a nulling of the bridge.

One of the improved features in accordance with the present invention is the reduced amount of liquid fill that is employed in the transducer. This drastically reduces the fill displacement and thus controls pressure induced deflections. This is thus successful in minimizing diaphragm stresses and in enabling the use of thicker diaphragms. The reduction in fill is carried out by virtue of the use of the sensing member 12 with its substantially minimal fill volume. The volume is also minimized by virtue of other structural elements that are employed including the relatively small snout chamber and capillary tube.

Reference is now also made to FIG. 6 which shows an enlarged fragmentary view illustrating a preferred embodiment for the snout end of the device illustrating the snout filler piece 70 which is primarily used for temperature compensation reasons. This piece may be constructed of Kovar or Invar. Alternatively, this may be constructed of any very low coefficient of expansion material. It is preferred that it have a coefficient of expansion much less than that of the stainless steel frame. This fill piece 70 allows the void in chamber 20 to expand at the same rate as the liquid during temperature changes. The filler piece 70 illustrated in FIG. 6, functions to reduce internal fill pressure as the tip is heated with no applied pressure.

There have been at least two different liquid fills that have been employed, one being mercury and the other sodium potassium (NaK). The NaK filled transducer is a lower pressure range transducer while the mercury transducer has a pressure range of 10,000–50,000 psi. The range of pressure operation when using a NaK fill is 10,000–15,000 psi.

Thus, the filler piece, in combination with the chamber 20 illustrated in FIG. 6, provides a thermally compensated internal volume which is desired. Also, the filler piece as indicated previously is selected to have thermal properties that temperature compensate the transducer for differential thermal expansion coefficients between the internal fluid which is preferably mercury and the main body of the transducer which is usually stainless steel. As indicated previously, it is preferred to have a low temperature coefficient of expansion particularly in comparison with that of the frame material.

One of the advantages that has been realized with the improved sensing technique of the present invention is the capability of now being able to increase the thickness of the diaphragm 16 while reducing the stresses thereof. It has also been possible in accordance with this construction to minimize overall thermal characteristics. Reducing fill displacement under pressure reduces the diaphragm deflection and the resulting stresses allows the diaphragm to be increased in thickness within certain limitations to improve insitu durability.

In connection with the above, the maximum diaphragm thickness is related to two independent effects including internal fluid displacement under applied pressure and secondly internal pressure generated by thermal expansion of the contained fluid fill. In accordance with the invention, the sensor's small internal volume reduces the amount of fill and its resulting compression. Moreover, the sensor's low displacement or deflection under pressure further reduces total fluid displacement and resulting stresses. Moreover, the filler piece is adapted to control thermally induced internal pressure that also further reduces stresses. The combined improvements outlined above allow diaphragm thickness to be increased without increasing stresses and controls internal pressure effects versus temperature. The snout filler piece 70 is used in essence to replace some of the stainless steel at the tip of the instrument with a low temperature coefficient of expansion material thus temperature compensating the void 20. This preferred material as indicated previously, is Kovar or Invar.

With regard to the reduction in volume, it is noted that the internal volume of the sensing member 12 is very small because the capillary tube fills the passage through the member with very close tolerance fit. As a matter of fact, in the illustration of FIG. 3, there is shown a relatively predominant recess 26 in the capillary tube. However, in another embodiment that may be employed, the capillary tube need not be recessed at all but instead one can rely upon the slight difference in diameter between the bore of the member 12 and the outer diameter of the capillary tube. In such case, the annular sensing chamber about the capillary tube actually extends between top and bottom ends of the sensing member from weld-to-weld.

By way of example, the amount of volume of liquid in the capillary tube may be approximately 75 percent of the volume in the annular space about the capillary tube. The total volume within the entire transducer including the capillary tube may be in a range from $1.0 \times 10^{-3}$ to $2.0 \times 10^{-3}''$ cube. This very small volume compares with a transducer volume on the order of $3.2 \times 10^{-3}''$ cube for a transducer which is of the type described in U.S. Pat. No. 3,678,753. It can be readily seen that there is an improvement in the reduction of volume fill by at least 2 to 1 between the volumes of the transducer in the prior art and that in the present construction. With regard to the capillary tube, the inner diameter thereof can range from 0.005 to 0.010", and the outer diameter thereof can range from 0.060" to 0.25".

With regard to the filling of the transducer, this is accomplished at the top end of the capillary tube. In FIG. 1 the capillary tube is shown capped off but before this occurs the capillary tube and the rest of the voids communicating therewith in the device are filled with say mercury under forced pressure so that all of the void areas are filled with the mercury. The capillary tube is then sealed off to retain the mercury in the transducer.

Reference is now made to FIG. 7 which is a graph of input pressure being sensed at the diaphragm versus the pressure lost at the snout diaphragm. There are actually two curves illustrated in FIG. 7. The curve C1 is a pressure curve for a prior art transducer such as the one described in U.S. Pat. No. 3,678,753. The curve C2 is the pressure curve for the transducer in accordance with the present invention. It is noted that even at high pressure ranges in the area of 40,000 psi that the absorbed pressure is only on the order of about 150 psi; consequently, diaphragm thickness can be increased. Increased thickness creates higher absorbed pressures, but its increased thickness will accommodate the higher pressures without generating higher stresses than those illustrated in curve C1 of FIG. 7.

Reference is now made to FIGS. 8-11 in connection with the teaching of the method of assembly of the transducer of the present invention and in particular a method of securing together the capillary tube and sensing element. In this connection previously, two separate embodiments have been described, one in FIG. 3 employing an annular chamber 28 about the capillary tube and another embodiment in which one relies upon a difference in diameter between the bore of the member 12 and the outer diameter of the capillary tube. However, it has been found that the capillary tube should not be too closely fitted in the bore of the sensing element. If the fit is too tight, then large non-linear calibration errors can occur due to capillary unevenness, bends in the capillary tube, and possible burrs at the drilled hole. This may cause the capillary tube to contact the bore under the strain gages causing these large non-linear calibration errors. The technique described in FIGS. 8-11 overcomes these problems.

Figure 8:
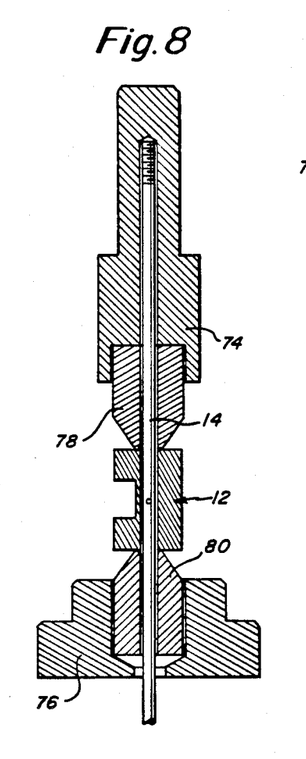
FIG. 8 illustrates the fixture that is employed along with the method of assembly for interconnection of the capillary tube and sensing element.

FIG. 8 shows the fixture that is used in carrying out the method of the present invention. This fixture includes an upper mandrel 74 and a lower mandrel 76. The upper mandrel 74 has a bore for receiving a portion of the capillary tube and also has a channel for receiving the upper crimp block 78. Similarly, the lower mandrel 76 has a channel for receiving the lower crimp block 80. Both of the crimp blocks 78 and 80 have passages therethrough for receiving the capillary tube in the manner illustrated in FIG. 8. FIG. 8 also shows the capillary tube 14 having been inserted in the bore of the sensing element 12.

Figure 9:
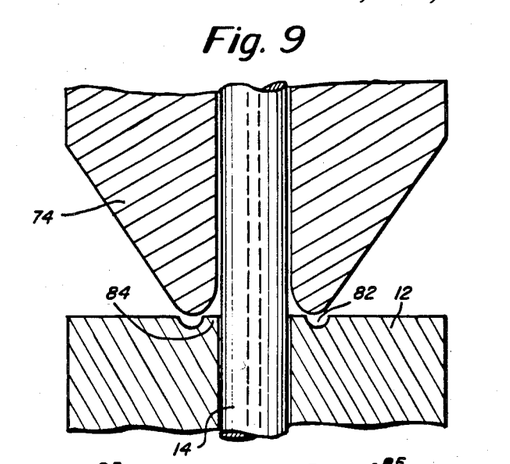
FIG. 9 is a cross-sectional view showing a first step in the method of assembly of the capillary tube and sensing element.

Now, in FIG. 9 there is illustrated in a fragmentary cross-sectional view, the capillary tube 14 and the sensing element 12. The fitting between the capillary tube and the sensing element is such that there is a gap G illustrated in FIG. 11 that is on the order of 0.001". FIG. 9 also illustrates the weld prep indentation 82 which is an annular indentation disposed about the circumference of the bore in the sensing element. This indentation defines on the inner side thereof, an annular ridge 84 as illustrated in FIG. 9. In FIG. 9 the upper mandrel 74 is disposed over the sensing element, but is not yet in contact therewith.

Figure 10:
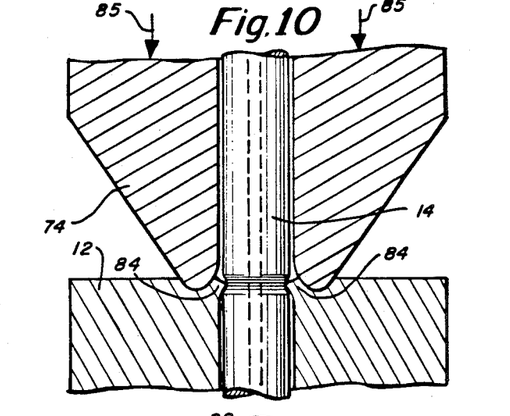
FIG. 10 is a fragmentary cross-sectional view illustrating a subsequent step in which the weld prep indentations have been swaged against the capillary tube to grip it.

FIG. 10 illustrates the upper mandrel 74 having been moved in the direction of arrows 85 so as to contact the indentation 82 and essentially crimp or swage the ridge 84 against the side of the capillary tube as illustrated in FIG. 10. FIG. 10 illustrates only one of the mandrels 74. However, it is understood that the operation is such that both mandrels are brought together at the same time crimping the weld prep indentations on either end of the sensing element 12.

Figure 11:
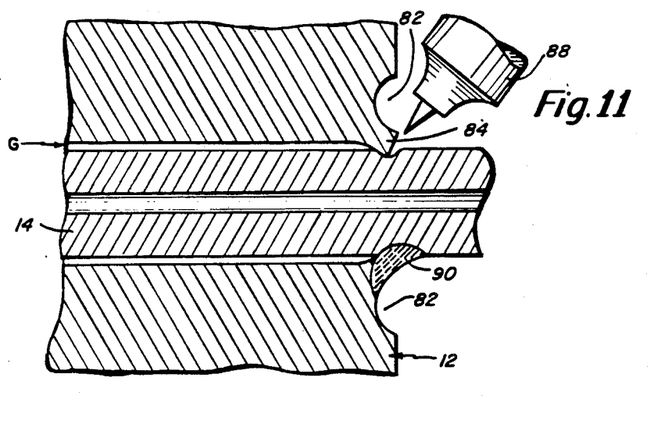
FIG. 11 is a further cross-sectional view showing subsequent steps including an illustration of the weld that is formed annularly about the capillary tube and between the capillary tube and sensing element.

After the capillary tube has been inserted through this sensing element into the position illustrated in FIG. 8 and after the weld indentations have been crimped as illustrated in FIG. 10, then welding can occur as illustrated in FIG. 11. In connection with the swaging or crimping, this is preferably controlled so that the force against the capillary is just enough to hold the sensing element to the capillary tube without it slipping up and down.

With regard to the welding, reference is made to FIG. 11 which shows the weld tip 88 directed at the juncture where the crimping has occurred at the ridge 84 about the periphery of the capillary tube. FIG. 11 also illustrates the final weld at 90. This is, of course, an annular weld that goes about the entire circumference of the capillary tube providing a liquid-tight seal thereabout so that the liquid fill within the transducer of course, could not be expelled at that location. The liquid is meant to be held in the annular chamber extending about the capillary tube in between the inner bore of the sensing element and the capillary tube.

Having now described a limited number of embodiments of the present invention, it should now be apparent to those skilled in the art that numerous other embodiments and modifications thereof are contemplated as falling within the scope of the present invention as defined by the appended claims.

What is claimed is:

1. In a liquid-filled pressure transducer having a frame, a capillary tube extending through the frame and a sensing element having a bore for receiving the capillary tube, a method of securing the sensing element to the capillary tube in a liquid-tight manner, said method comprising the steps of, providing a weld prep indentation in the sensing element adjacent and about the sensing element bore, inserting the capillary tube in the sensing element, swaging the weld prep indentation so as to grip the capillary tube with at least a small gripping force, and welding the area about the capillary tube where the weld prep indentation is disposed to form a liquid-tight weld between the capillary tube and sensing element.

2. A method as set forth in claim 1 wherein the step of providing a weld prep indentation includes providing an annular indentation formed by an inner ridge adjacent the capillary tube when inserted in the sensing element.

3. A method as set forth in claim 2 wherein the step of swaging the weld prep indentation includes distorting the indentation to deflect said inner ridge so as to contact the capillary tube about the circumference thereof.

4. A method as set forth in claim 1 including providing weld prep indentations at opposite ends of the sensing element, adjacent and about the sensing element bore and welding at both ends of the sensing element about the capillary tube where the weld prep indentation is disposed to form a liquid tight weld between the capillary tube and both ends of the sensing element.

5. In a liquid-filled pressure transducer having a frame, a capillary tube extending through the frame and a sensing element having a bore for receiving the capillary tube, a method of securing the sensing element to the capillary tube at both ends of the sensing element and in a liquid tight manner, said method comprising the steps of, inserting the capillary tube in the sensing element, causing the edge of the bore to be distorted to deflect the annular edge to contact and grip the capillary tube substantially about the circumference thereof, and welding the area about the capillary tube at the deflected annular edge at either end of the sensing element to form a liquid tight weld between the capillary tube and the ends of the sensing element.

6. A pressure transducer comprising;
an elongated frame having an elongated passage therethrough,
a capillary tube extending through the frame passage and terminating at one end adjacent one end of the frame,
a coupler at said one end of the frame and defining with the frame a chamber in communication with the capillary tube,
a sensing member disposed about the capillary tube at the other end of the frame and having a bore defining with the capillary tube an annular sensing chamber in fluid communication with the capillary tube, and means defining a recess in the sensing member forming a relatively thin wall adjacent said annular sensing chamber,
said capillary tube and sensing member having a gap defined therebetween,
means for sensing pressure at said wall, and means for securing the capillary tube at the top and bottom ends of the sensing member including annular weld beads at either end,
the gap between the capillary tube and the bore in the sensing member being on the order of 0.00".

7. In a liquid-filled pressure transducer having a frame, a capillary tube extending through the frame and a sensing element having a bore for receiving the capillary tube, a method of securing the sensing element to the capillary tube in a liquid-tight manner, said method comprising the steps of, inserting the capillary tube in the sensing element, causing the edge of the bore to be distorted to deflect the annular edge to contact and grip the capillary tube with at least a small gripping force, and welding the area about the capillary tube at the deflected annular edge to form a liquid tight weld between the capillary tube and the the sensing element.

8. In a liquid-filled pressure transducer having a frame, a capillary tube extending through the frame and a sensing element having a bore for receiving the capillary tube, a method of securing the sensing element to the capillary tube at both ends of the sensing element and in a liquid tight manner, said method comprising the steps of, inserting the capillary tube in the sensing element, holding the capillary tube in fixed position within the bore of the sensing element, and welding the area about the capillary tube about the sensing element bore at either end of the sensing element to form a liquid tight weld between the capillary tube and the ends of the sensing element.

9. In a liquid-filled pressure transducer having a frame, a capillary tube extending through the frame and a sensing element having a bore for receiving the capillary tube, a method of securing the sensing element to the capillary tube in a liquid tight manner, said method comprising the steps of, inserting the capillary tube in the bore of the sensing element, holding the capillary tube in fixed position within the bore of the sensing element, and welding the area about the capillary tube and about the sensing element bore to form a liquid tight weld between the capillary tube and sensing element.

10. Apparatus for securing a capillary tube in a bore of a sensing element, said capillary tube adapted to extend beyond the sensing element at either end thereof, said apparatus comprising, an upper mandrel, a lower mandrel, and upper crimp blocks supported by said upper mandrel, a lower crimp block supported by said lower mandrel and means for bringing said crimp blocks together to contact the sensing element about the bore to crimp a ridge against the side of the capillary tube to hold the capillary tube within and relative to the bore of the sensing element.

11. A pressure transducer comprising;
an elongated frame having an elongated passage therethrough,
a capillary tube extending through the frame passage and terminating at one end adjacent one end of the frame,
a coupler at said one end of the frame and defining with the frame a chamber in communication with the capillary tube,
a sensing member disposed about the capillary tube at the other end of the frame and having a bore defining with the capillary tube an annular sensing chamber in fluid communication with the capillary tube, and means defining a relatively thin wall forming a sensing surface adjacent said annular sensing chamber,
said capillary tube and sensing member having a gap defined therebetween,
means for sensing pressure at said wall,
and means for securing the capillary tube at the top and bottom ends of the sensing member,
the gap between the capillary tube and the bore in the sensing member being on the order of 0.001".

12. A pressure transducer comprising;
an elongated frame having an elongated passage therethrough,
a capillary tube extending through the frame passage and terminating at one end adjacent one end of the frame,
a coupler at said one end of the frame and defining with the frame a chamber in communication with the capillary tube,
a sensing member disposed about the capillary tube at the other end of the frame and having a bore defining with the capillary tube an annular sensing chamber in fluid communication with the capillary tube, and means defining a relatively thin wall forming a sensing surface adjacent said annular sensing chamber, said capillary tube and sensing member having a gap defined therebetween, means for sensing pressure at said wall, the gap between the capillary tube and the bore in the sensing member being on the order of 0.001".

* * * * *